(12) United States Patent
Rolt et al.

(10) Patent No.: US 6,490,385 B1
(45) Date of Patent: Dec. 3, 2002

(54) DIMENSIONALLY STABLE DEVICE CONSTRUCTION

(75) Inventors: Stephen Rolt, Herts (GB); Gordon Henshall, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/864,844

(22) Filed: May 24, 2001

(51) Int. Cl.[7] .................. G02B 6/26; G02B 6/42; G02B 6/35

(52) U.S. Cl. .................. 385/18; 385/15; 385/16; 385/17; 385/14

(58) Field of Search .................. 385/15, 16, 17, 385/18, 12, 13, 14

(56) References Cited

U.S. PATENT DOCUMENTS

| | | | |
|---|---|---|---|
| 4,968,110 A | * | 11/1990 | Bulmer et al. .............. 359/246 |
| 5,091,983 A | * | 2/1992 | Lukosz .................. 250/231.19 |
| 5,359,449 A | * | 10/1994 | Nishimoto et al. ......... 359/181 |
| 5,848,206 A | * | 12/1998 | Labeye et al. ................. 385/16 |
| 5,887,089 A | * | 3/1999 | Deacon et al. ................. 385/10 |
| 6,367,335 B1 | * | 4/2002 | Hicks et al. ........... 250/227.14 |
| 6,392,779 B1 | * | 5/2002 | Iannelli et al. .............. 359/237 |

* cited by examiner

Primary Examiner—John D. Lee
Assistant Examiner—Daniel Valencia
(74) Attorney, Agent, or Firm—Lee, Mann, Smith, McWilliams, Sweeney & Ohlson

(57) ABSTRACT

Distortion compensation of an optical micro-electromechanical system (MEMS) device disposed on a substrate surface is effected by measuring degradation of an optical parameter of the device and applying a force to the substrate to reverse the degradation. The compensating force may be provided via a layer of piezo-electric material bonded to the opposite surface of the substrate and to which a control voltage is applied. The device distortion may arise from thermal mismatch effects in a package housing containing the device. Typically, the MEMS device comprises an optical crosspoint switch array.

10 Claims, 5 Drawing Sheets

DIMENSIONALLY STABLE DEVICE CONSTRUCTION

FIELD OF THE INVENTION

This invention relates to arrangements and methods for preventing distortion of integrated opto-electronic devices.

BACKGROUND OF THE INVENTION

Complex opto-electric devices for example micro-electro mechanical systems (MEMS) devices are being introduced into communications networks to provide a number of functions including switching and light source applications. These devices are typically formed on a substrate formed from a ceramic material or from a single crystal semiconductor material. As the devices become more complex, larger area substrates are required.

A characteristic feature of these devices is the critical alignment that must be maintained between the optical components of the device in order to minimise loss of optical signals between those components.

A typical device of this type is the MEMs crosspoint switch. This device comprises an array of individually actuable mirrors formed in a silicon substrate and provides a non-blocking crossbar architecture in which switching is effected between a plurality of optical inputs and outputs. Devices of this type have the potential to become key components in the rapid expansion of the Optical Internet. However, the introduction of these devices is currently constrained by their extreme sensitivity to distortion arising from mechanical stress caused e.g. by thermal mismatch in the package assembly within which the device is housed. This extreme sensitivity to distortion is a particular problem for the larger packaged devices now being developed.

Optical crosspoint switches that are currently being proposed have a typical substrate size of about 60 mm square. These devices operate by switching of optical beams having a typical beam waist of about 240 microns and, to prevent degradation of performance, it is necessary to maintain accurate alignment of the beam. It has been found for example that, over a distance of 60 mm, it is necessary to ensure that the beam does not deflect from its true path by an angle greater than 0.5 milliradian. Beam deflections of this order can easily be caused by thermal mismatch and/or mechanical stress of the package in which the MEMs device is mounted. It will further be appreciated that as devices increase in size and complexity, there will be a corresponding increase in the problem of distortion.

A potential solution to the problem of distortion is to mount the MEMs device on a stable surface within an enclosed housing provided with a thermostatically controlled temperature. However, such an assembly is relatively costly. Further, such a structure occupies a significant physical volume, which can be a disadvantage where space is at a premium. In addition, this solution does not address the problem of long term ageing effects, which may need to be considered when a high reliability working life of many years is envisaged.

SUMMARY OF THE INVENTION

An object of the invention is to minimise or to overcome the above disadvantage.

A further object of the invention is to provide an improved device construction.

According to a first aspect of the invention, there is provided an optical device disposed on a first major surface of a substrate, the device having sensing means associated with the device for detecting distortion of the substrate, and feedback control means responsive to the sensing means for applying a force to the substrate so as to compensate for the effect of such distortion.

According to another aspect of the invention there is provided an optical device disposed on a first major surface of a substrate, the device having input and output optical signal paths, sensing means associated with a said output optical signal path and arranged to detect a reduction of a signal on that path corresponding to a distortion of the substrate, means for applying a force to the substrate, and feedback control means responsive to the sensing means for controlling said force applying means so as to negate said distortion of the substrate.

According to another aspect of the invention there is provided an optical micro-electro-mechanical system (MEMS) device disposed on a first major surface of a substrate, the device having a first set of input optical waveguides, a second set of output optical waveguides, an array of switch elements disposed on said first major surface and each arranged to couple selectively optical signals between a respective input optical waveguide and output optical waveguide, signal sensing means associated with one or more of said output optical waveguides and arranged to detect a distortion of the substrate as a reduction in amplitude of a signal carried on said one or more output optical waveguides, means for applying a force to the substrate, and feedback control means responsive to the sensing means for controlling said force applying means so as to negate said distortion of the substrate.

According to another aspect of the invention there is provided an optical device disposed on a first major surface of a laminar substrate, the device having sensing means associated with the device for detecting distortion of the substrate, and means for applying a controlled force to the substrate so as to compensate for the effect of such distortion.

According to another aspect of the invention, there is provided a method of distortion compensation of an optical device disposed on a laminar semiconductor substrate, the method comprising, detecting distortion of the substrate by measurement of an optical parameter of said optical device, and, in response to said distortion detection, applying a force to the substrate so as to negate such distortion.

Advantageously, the actuator comprises a layer of piezo-electric material applied to the substrate lower surface and to which a controlled voltage is applied to impart a force to that surface so as to negate a distortion hereof. Preferably, the piezo-electric material is pre-compressed. Typically, the distortion sensitive device comprises a MEMS device such as a crosspoint switch or a laser package.

The PZT material may be provided in sheet form and bonded to the substrate by a heat curing adhesive.

In a preferred embodiment, an oscillatory signal is superimposed on an electrical control signal applied to the layer of a piezo-electric material. Phase detection of a corresponding oscillatory signal in the measured optical parameter provides a feedback for increasing or decreasing the magnitude of the control signal.

It will be understood that the above description of a preferred embodiment is given by way of example only and that various modifications may be made by those skilled in the art without departing from the spirit and scope of the invention.

BRIEF DESCRIPTION OF THE DRAWINGS

An embodiment of the invention will now be described with reference to the accompanying drawings in which.

DESCRIPTION OF PREFERRED EMBODIMENTS

Figure 1:
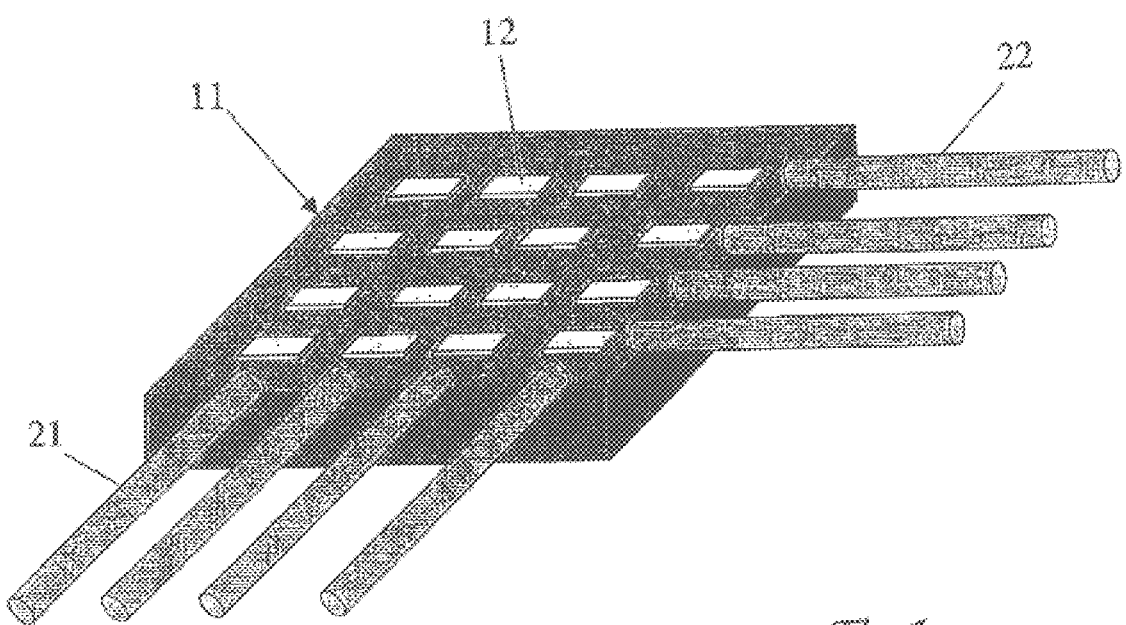
FIG. 1 is a general schematic view of a MEMs crosspoint switch device.
Figure 1A:
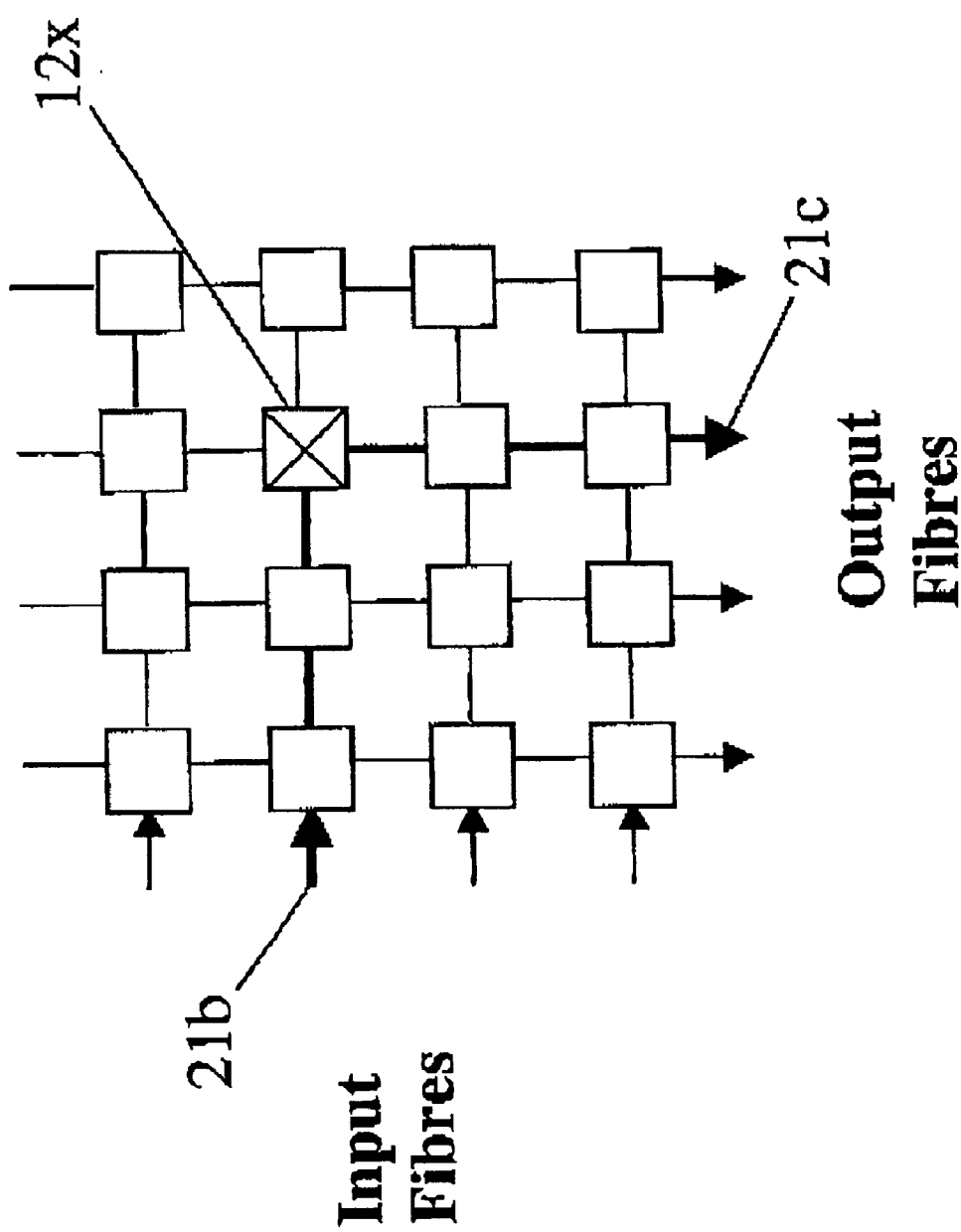
FIG. 1a is a logical diagram of the crosspoint switch of FIG. 1.

Referring first to FIG. 1, this shows a general view of a micro-electro mechanical crosspoint switch device structure comprising a substrate 11 on which formed a plurality of independently actuable mirrors 12 which constitute the switching elements of the crosspoint switch. Conveniently, the substrate comprises single crystal silicon. The mirrors provide switching of optical carriers between a set of input fibres 21 and a set of output fibres or waveguides 22. The input and output fibres are arranged mutually perpendicular along two adjacent edges of the substrate. The switching elements 12 comprise mirrors formed from the substrate material and individually actuable so as to connect selectively an optical input to an optical output. Actuation of the mirrors 12 can be electrostatic, electromagnetic or thermal. For example. as shown in the logic diagram of FIG. 1a, selective operation of the crosspoint element 12x provides an optical path connection between input fiber 21b and output fibre 22c. With this architecture, both fibres and single wavelengths can be switched.

The device of FIG. 1 will typically be incorporated in a network node to perform a communications switching function.

It will be appreciated that, for correct operation of the device of FIG. 1, optical alignment of the device components is critical. This alignment is defined when the device is manufacture and must be maintained during subsequent operation of the device.

Figure 2:
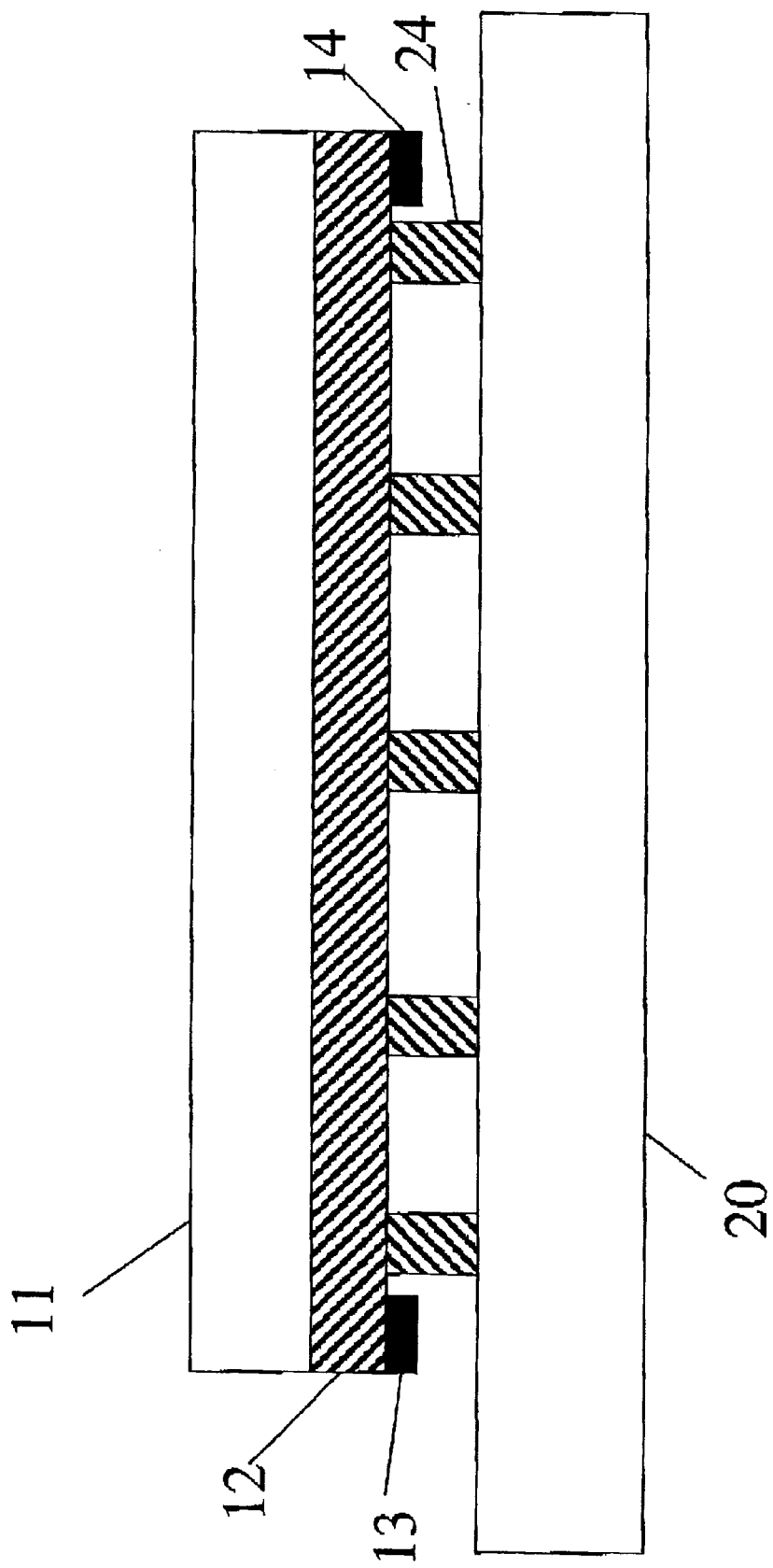
FIG. 2 is a sectional view of the device of FIG. 1.

Although not shown in FIG. 1 for reasons of clarity, the device structure of FIG. 1 will normally be housed in a protective package. Distortion of this package, e.g. resulting from thermal mismatch effects has in the potential to impart distortion to the device itself thus impairing its optical properties, Referring now to FIG. 2, this depicts a cross-sectional view of the device of FIG. 1 and illustrates a preferred technique for overcoming the effects of distortion of the device. As shown in FIG. 2, the substrate 11 is mounted on a package support surface 20 and is spaced therefrom by an array of bismuth telluride or lead telluride pillars 24 which can be used to provide thermoelectric cooling of the substrate. The substrate 11 is provided on its surface opposite the device surface, with a layer 12 of a piezo-electric material. Electrodes 13, 14 attached to the piezo-electric layer 12 enable the application of a controlled voltage through from voltage supply 15.

Application of a voltage to the piezo layer 12 causes that layer to distort thus imparting a corresponding force to the substrate 11. As will be described below, a control feedback arrangement is employed to balance external forces applied to the substrate via the device packaging with an opposite force applied via the piezo layer 12 so as to maintain an equilibrium condition in which the substrate is substantially non-distorted This ensures that the device structure formed on the substrate maintains a maximum performance level.

Suitable materials for fabricating the piezo-electric layer 12 comprise ceramics such as barium titanate, lead titanate zirconate, or polymeric materials such as PVDF. These materials are commercially available in sheet form and may be applied or bonded to the substrate surface by the use of an adhesive such as a thermally cured epoxy resin.

We have employed barium titanate sheet material of about 2 mm in thickness to provide a PZT layer on which nickel electrodes were deposited. Bonding to the substrate surface was effected by a layer of epoxy resin approximately 10 to 20 microns in thickness. Curing for about 10 minutes at 120° C., or for about 2 hours at 85° C. provided an effective bond.

For a typical silicon substrate size of 60 mm by 60 mm, the stored energy in the substrate corresponding to an angular deflection of 0.5 mrad is approximately 85 mJ. We have found that an equivalent deformation energy to negate this deflection of the substrate can be supplied by a piezo-actuator that has been pre-compressed. A typical PZT material has a Young's Modulus of 44 GPa and a compressive strength of 880 MPa. If a maximum working compressive stress of 300 MPa were to be adopted, the maximum deformation energy per unit volume would be about 1 $MJm^{-3}$. Assuming that 10% of this energy is coupled into the mechanical assembly described, then the total available energy would be 100 $KJm^{-3}$ or 100 $mJcm^{-3}$. This means that about 0.85 $cm^3$ of PZT material would be required for this, i.e. the distortion of a relatively large mechanical assembly may be combated with a relatively modest amount of PZT material. The exact details of any mechanical arrangement would be application dependent. For example, a piezo sheet 12 and a compressor layer (not shown) could be attached to the silicon as a sandwich structure. In an alternative embodiment, piezo actuator elements could be incorporated into the package structure.

Figure 3:
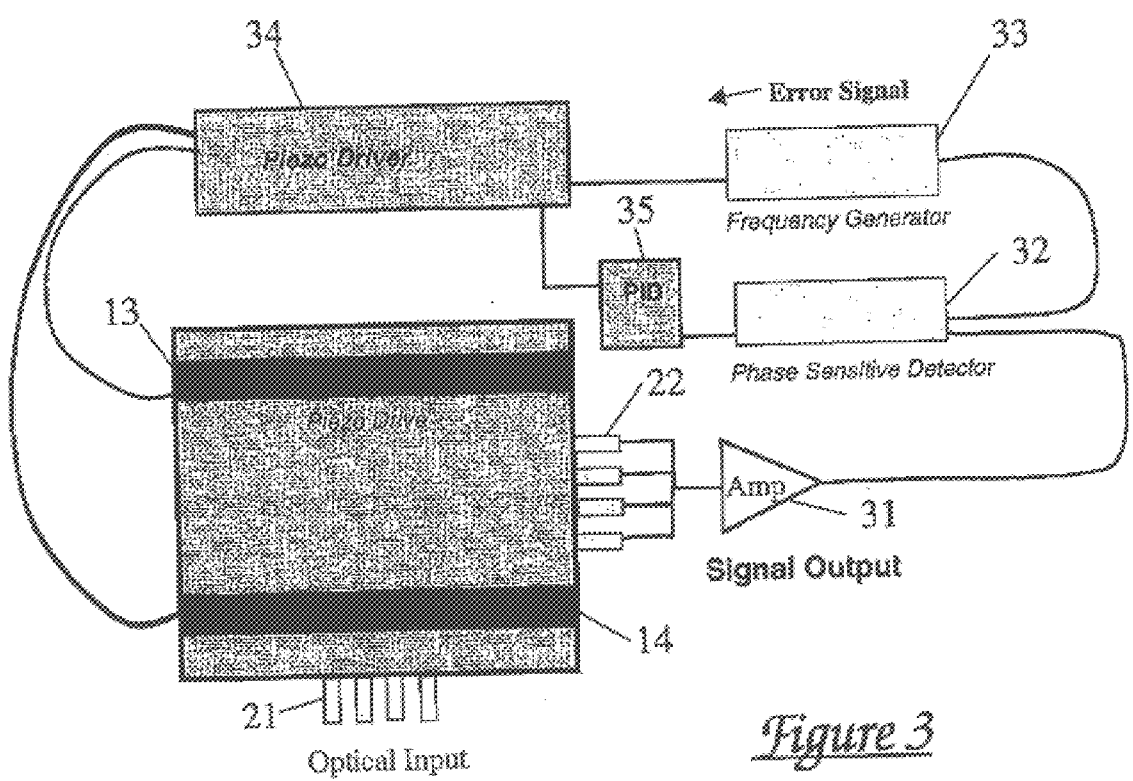
FIG. 3 shows a feedback control arrangement for overcoming the effects of distortion of the device of FIGS. 1 and 2.

Referring now to FIG. 3, this shows a preferred circuit arrangement for providing feedback distortion control of the substrate. The arrangement exploits existing hardware that is provided to monitor the outputs of the MEMS cross point switch formed on the substrate. A servo loop is used to maximise the optical outputs of the switches. The advantage of this approach is that it is highly flexible. A suitable output derived signal can be used as the control signal. In the MEMS device described above, for example, this output derived signal may comprise an analogue summation of all channels or selected channels, or alternatively, just one channel. To aid the control loop, a small low frequency a.c. signal (e.g. 200 Hz) is supplied to the piezo-actuators. This produces a similar oscillation in the control signal whose phase is then used as error signal.

In the arrangement of FIG. 3, signals provided by monitoring of the output fibres of the crosspoint switch of FIGS. 1 and 2 are summed and fed via amplifier 31 to the first input of a phase sensitive detector 32. The second input of the phase sensitive detector 32 receives a signal of about 200 Hz from frequency generator 33. This 200 Hz signal is also provided to a piezo driver 34.

The output of the phase sensitive detector comprises a feedback signal which is fed via proportional integrator differentiator (PID) controller 35 to the piezo driver 34 to control the voltage output of the driver such that the voltage applied to electrodes 13, 14 disposed on the piezo layer generates a force on the substrate that negates the measured distortion. The PID controller provides critical damping of the feedback loop.

Figure 4:
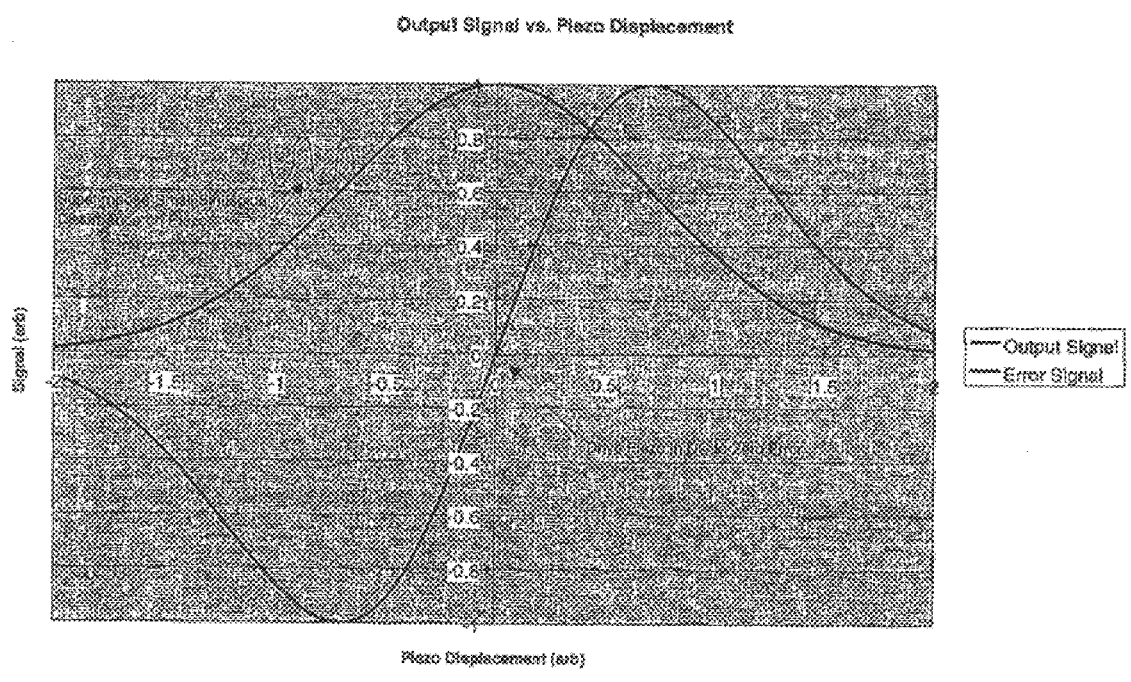
FIG. 4 is a graphical analysis illustrating the mechanism of the control arrangement of FIG. 3

The purpose of the frequency generator is to provide a low amplitude oscillatory signal that is superimposed on the feedback control signal from the phase sensitive detector. The voltage signal that is applied to the piezo layer thus comprises a steady voltage on which a small oscillation is superimposed thus causing the piezo layer to oscillate about its controlled configuration. This provides a corresponding variation in the optical output parameter that is employed as a measure of the device performance. By matching the phase of this variation with that of the frequency generation output, a determination is made as to whether the piezo drive voltage should be increased or decreased to maintain the equilibrium condition. This process is illustrated in the graphical representation of FIG. 4 which shows both the optical signal and the error signal as a function of angular distortion of the substrate.

It will be appreciated that the technique described above is in no way confined to use with piezo-electric materials, and that other mechanisms can be provided for applying a distortion-compensating force to the substrate. For example, magnetic, electrostatic or pneumatic mechanisms may be employed for this purpose.

It will be understood that the above description of a preferred embodiment is given by way of example only and that various modifications may be made by those skilled in the art without departing from the spirit and scope of the invention.

What is claimed is:

1. An optical micro-electro-mechanical system (MEMS) device disposed on a first major surface of a substrate, the device having a first set of input optical waveguides, a second set of output optical waveguides, an array of switch elements disposed on said first major surface and each arranged to couple selectively optical signals between a respective input optical waveguide and output optical waveguide, signal sensing means associated with one or more of said output optical waveguides and arranged to detect a distortion of the substrate as a variation in amplitude of a signal carried on said one or more output optical waveguides, means for applying a force to the substrate, and feedback control means responsive to the sensing means for controlling said force applying means so as to negate said distortion of the substrate.

2. An optical device as claimed in claim 1, wherein said means for applying a force to the substrate comprises a layer of a piezo-electric material applied to a surface of the substrate opposite said first major surface.

3. An optical device as claimed in claim 2, wherein said piezo-electric material comprises barium titanate or lead titanate zirconate.

4. An optical device as claimed in claim 2, wherein said piezo-electric material comprises a polymeric material.

5. An optical device as claimed in claim 3, wherein said piezo-electric material is bonded to said substrate with an adhesive.

6. An optical micro-electro-mechanical system (MEMS) device disposed on a first major surface of a substrate, the device having sensing means associated with the device for detecting distortion of the substrate, and means for applying a controlled force to the substrate so as to compensate for the effect of such distortion, wherein said means for applying a force to the substrate comprises a layer of a piezo-electric material applied to a surface of the substrate opposite said first major surface, and wherein said substrate comprises a body of single crystal silicon.

7. An optical device as claimed in claim 6, wherein said piezo-electric material comprises barium titanate or lead titanate zirconate.

8. An optical device as claimed in claim 6, wherein said piezo-electric material comprises a polymeric material.

9. An optical device as claimed in claim 6, and comprising a crosspoint switch.

10. An optical device as claimed in claim 7, wherein said piezo-electric material is bonded to said substrate with an adhesive.

\* \* \* \* \*